March 8, 1932.  G. R. LEGGETT  1,848,569
BEARING
Filed March 29, 1929
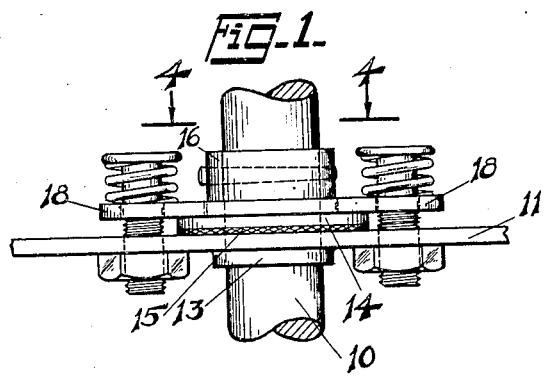
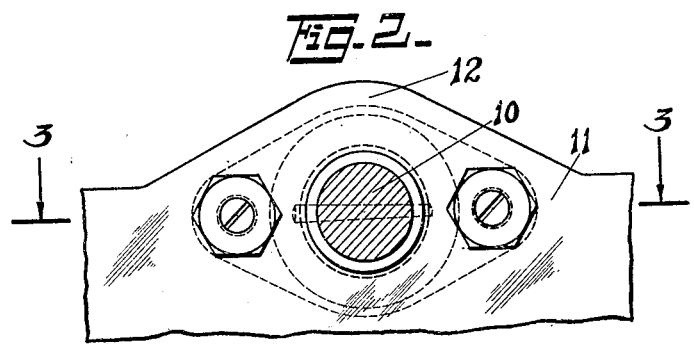
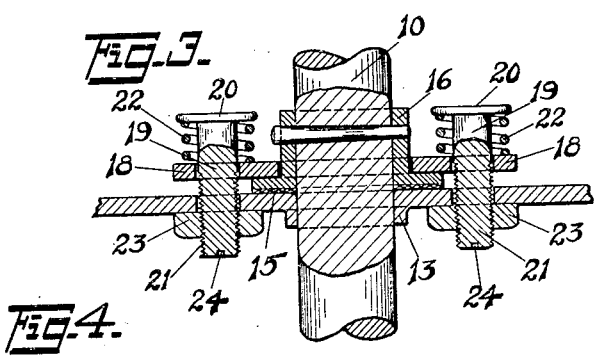
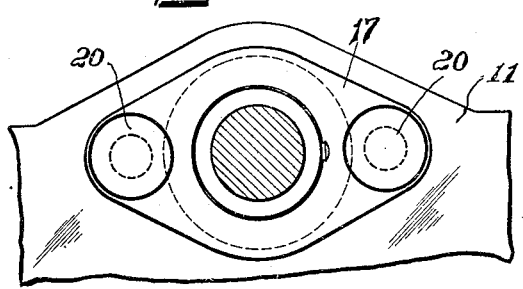
Inventor
George R. Leggett
By his Attorneys
Philipp, Sawyer, Rice & Kennedy Patented Mar. 8, 1932

1,848,569

UNITED STATES PATENT OFFICE

GEORGE R. LEGGETT, OF WATERBURY, CONNECTICUT, ASSIGNOR TO SCOVILL MANUFACTURING COMPANY, OF WATERBURY, CONNECTICUT, A CORPORATION OF CONNECTICUT

BEARING

Application filed March 29, 1929. Serial No. 350,886.

This invention relates to bearings and more particularly to bearings of the thrust type.

It is an object of the invention to provide a bearing of the thrust type for application to the shaft of a variable condenser.

It is a further object of the invention to provide a bearing having adjustable means for varying the frictional retarding force opposing rotation of the shaft.

A still further object of the invention is to produce a bearing of simple construction which is cheap to manufacture and easy to assemble.

With these general objects, and others not specifically mentioned, in view, the invention resides in the combinations, features, details of construction, and arrangements of parts which will first be described in connection with the accompanying drawings and then more particularly pointed out.

In the drawings:

Figure 1 is a plan view of a construction embodying the present invention;

Figure 2 is an end elevation thereof;

Figure 3 is a cross-sectional view taken as on the line 3—3 of Figure 2;

Figure 4 is a cross-sectional view taken as on the line 4—4 of Figure 1.

Referring to the drawings, there is shown a portion of a shaft 10 which may, for example, be the shaft for the rotor of a variable condenser. As shown, the shaft extends through and is journalled in the frame 11 of the condenser. To this end, the frame plate 11 is swelled as at 12 to provide the metal for the bearing. The plate 11 is also equipped with an integral rib or collar 13 which projects laterally from the outer surface of the plate and surrounds the shaft to increase the bearing surface thereof.

Means are provided for taking the thrust of the shaft in both axial directions. Although capable of various constructions, as here shown as an example, a flange 14 is provided on the shaft and lies against the inner surface of the frame plate 11. For reducing wear on the metal, a flat washer 15 of leather or other material may be interposed on the shaft between the flange and plate. The shaft is shown with a collar 16 keyed thereto on the inner side of the flange. Beyond this collar, the rotor is located. The flange may be formed as an integral part of the collar.

Means are provided for maintaining the flange and washer for contact with the plate. In exemplifications which embody the invention to what is now considered the best advantage, the means are resilient and adjustable. Although capable of various constructions, as here shown as an example, a plate element 17 surrounds collar 16 and abuts the inner surface of flange 14. The plate 17 is provided with side extensions 18, through which extend studs 19 having heads 20 and screw-threaded ends 21 passing through tapped holes in frame plate 11. Coiled springs 22 surround the studs between the heads thereof and the plate 17 and lock nuts 23 are screwed on the threaded ends of the studs and against the outer surface of the frame plate 11. The ends of the studs are slotted as at 24 to allow convenient turning thereof, as by a screw driver, from the exterior of the condenser and easy accessibility thereto.

The plate 17 is urged by the springs toward the frame plate 11 and clamps the flange and washer against the same. Thrust in one direction is thus resisted by the frame plate, and in the other direction by the compression springs. In addition, there is provided a frictional retarding force tending to prevent rotation of the shaft by virtue of the clamped condition of the flange. The shaft and rotor carried thereby are consequently maintained in their adjusted positions. The adjustments of the studs increase or diminish the amount of friction and the right amount can be obtained by such adjustments. The frictional resistance should be such as to permit turning of the shaft without difficulty and great enough to maintain the shaft in the position adjusted to in turning the condenser. The use of the double spring construction herein illustrated provides an even distribution of force on the flange and a well-balanced construction. In addition, this form of construction renders the adjusting devices easily accessible and the whole bearing may be assembled and dismounted conveniently and quickly.

What is claimed is:

1. A bearing construction comprising a relatively stationary supporting frame member, a rotatable shaft extending through an opening in said member, a flange fast on the shaft, and resilient means for urging said flange against the frame member, said means comprising an element acting against the flange, studs extending through the element and into the frame member, and compression springs coiled about the studs between the heads thereof and the element.

2. A bearing construction comprising a relatively stationary supporting frame member, a rotatable shaft extending through an opening in said member, a flange fast on the shaft for coaction with one surface of the frame member, a plate acting against the other surface of the flange, diametrically-opposed headed studs extending through the plate and having threaded ends entering the frame member, compression springs coiled about the studs between the heads thereof and the plate, the studs being adjustable to vary the compression of the springs.

3. A bearing construction comprising a relatively stationary supporting frame member, a rotatable shaft extending through an opening in said member, a flange fast on the shaft for coaction with one surface of the frame member, resilient means for urging the flange against the frame member, said means embodying a headed threaded stud extending into the frame member, a spring coiled around the stud and engaging the head thereof and acting to urge the flange against the frame member, one end of the stud being slotted for convenient turning in adjustment.

In testimony whereof, I have hereunto set my hand.

GEORGE R. LEGGETT.